(12) United States Patent
Clark

(10) Patent No.: US 10,532,496 B2
(45) Date of Patent: *Jan. 14, 2020

(54) METHODS FOR MANUFACTURING BULKED CONTINUOUS FILAMENT

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,583

(22) Filed: May 3, 2019

(65) Prior Publication Data

US 2019/0255740 A1      Aug. 22, 2019

Related U.S. Application Data

(60) Continuation of application No. 16/041,442, filed on Jul. 20, 2018, which is a continuation of application (Continued)

(51) Int. Cl.
*D01F 1/06*  (2006.01)
*D02G 3/24*  (2006.01)
(Continued)

(52) U.S. Cl.
CPC .......... *B29B 17/02* (2013.01); *B01D 29/0095* (2013.01); *B29B 17/00* (2013.01);
(Continued)

(58) Field of Classification Search
CPC ........ B29B 2013/002; B29B 2013/005; B29C 48/255; B29C 48/2552; B29C 48/425;
(Continued)

(56) References Cited

U.S. PATENT DOCUMENTS

| 1,490,918 A | 4/1924 | Gaede |
| 2,146,532 A | 2/1939 | Crane |

(Continued)

FOREIGN PATENT DOCUMENTS

| AU | 2013267847 | 3/2014 |
| AU | 2014215998 | 9/2014 |

(Continued)

OTHER PUBLICATIONS

Notice of Allowance, dated Sep. 12, 2016, from corresponding U.S. Appl. No. 13/892,713.

(Continued)

*Primary Examiner* — Leo B Tentoni
(74) *Attorney, Agent, or Firm* — Brient IP Law, LLC

(57) ABSTRACT

A method for manufacturing bulked continuous carpet filament, the method comprising: (1) reducing a chamber pressure within a chamber to below about 5 millibars; (2) after reducing the chamber pressure to below about 5 millibars, providing a polymer melt to the chamber; (3) separating the polymer melt into at least eight streams; (4) while the at least eight streams of the polymer melt are within the chamber, exposing the at least eight streams of the polymer melt to the chamber pressure of below about 5 millibars; (5) after exposing the at least eight streams of the polymer melt to the chamber pressure of below about 5 millibars, recombining the at least eight streams into a single polymer stream; and (6) forming polymer from the single polymer stream into bulked continuous carpet filament.

30 Claims, 5 Drawing Sheets

Related U.S. Application Data

No. 15/204,645, filed on Jul. 7, 2016, now Pat. No. 10,124,513, which is a continuation of application No. 14/256,261, filed on Apr. 18, 2014, now Pat. No. 9,409,363, which is a continuation of application No. 13/892,713, filed on May 13, 2013, now Pat. No. 9,550,338, which is a division of application No. 13/721,955, filed on Dec. 20, 2012, now Pat. No. 8,597,553.

(60) Provisional application No. 61/654,016, filed on May 31, 2012.

(51) Int. Cl.

| | | |
|---|---|---|
| *B29B 17/02* | (2006.01) | |
| *B29C 48/38* | (2019.01) | |
| *D01D 1/10* | (2006.01) | |
| *D01F 6/62* | (2006.01) | |
| *B29B 17/00* | (2006.01) | |
| *B29C 48/92* | (2019.01) | |
| *B29C 48/425* | (2019.01) | |
| *C08J 11/06* | (2006.01) | |
| *B29D 99/00* | (2010.01) | |
| *B01D 29/00* | (2006.01) | |
| *D01D 5/08* | (2006.01) | |
| *B29C 48/385* | (2019.01) | |
| *B29C 48/05* | (2019.01) | |
| *C08J 11/04* | (2006.01) | |
| *D01D 5/00* | (2006.01) | |
| *B29C 48/255* | (2019.01) | |
| *B29C 48/44* | (2019.01) | |
| *B29C 48/70* | (2019.01) | |
| *B29C 48/43* | (2019.01) | |
| *B29K 67/00* | (2006.01) | |
| *B29K 105/26* | (2006.01) | |
| *B29K 105/00* | (2006.01) | |
| *B29C 48/435* | (2019.01) | |
| *B29C 48/14* | (2019.01) | |
| *B29C 48/76* | (2019.01) | |
| *B29B 13/00* | (2006.01) | |

(52) U.S. Cl.
CPC ............ *B29C 48/05* (2019.02); *B29C 48/255* (2019.02); *B29C 48/2552* (2019.02); *B29C 48/38* (2019.02); *B29C 48/385* (2019.02); *B29C 48/425* (2019.02); *B29C 48/43* (2019.02); *B29C 48/44* (2019.02); *B29C 48/70* (2019.02); *B29C 48/92* (2019.02); *B29D 99/0078* (2013.01); *C08J 11/04* (2013.01); *C08J 11/06* (2013.01); *D01D 1/103* (2013.01); *D01D 1/106* (2013.01); *D01D 5/00* (2013.01); *D01D 5/08* (2013.01); *D01F 6/62* (2013.01); *B29B 2013/002* (2013.01); *B29B 2013/005* (2013.01); *B29B 2017/0015* (2013.01); *B29B 2017/0224* (2013.01); *B29C 48/144* (2019.02); *B29C 48/435* (2019.02); *B29C 48/766* (2019.02); *B29C 2948/922* (2019.02); *B29C 2948/92514* (2019.02); *B29C 2948/92876* (2019.02); *B29K 2067/003* (2013.01); *B29K 2105/0067* (2013.01); *B29K 2105/26* (2013.01); *C08J 2367/02* (2013.01); *D10B 2503/04* (2013.01); *H05K 999/99* (2013.01); *Y02P 20/143* (2015.11); *Y02W 30/70* (2015.05)

(58) Field of Classification Search
CPC ....... B29C 48/43; B29C 48/435; B29C 48/44; B29C 48/70; D01D 1/103; D01D 1/106; D01D 5/08; D01F 1/06; D01F 6/62; D02G 3/24
USPC ......... 264/40.1, 78, 101, 102, 176.1, 211.21, 264/211.22, 211.23
See application file for complete search history.

(56) References Cited

U.S. PATENT DOCUMENTS

| | | |
|---|---|---|
| 3,217,783 A | 11/1965 | Wolf |
| 3,310,837 A | 3/1967 | Wittrock |
| 3,357,049 A | 12/1967 | Wolfgang |
| 3,608,001 A | 9/1971 | Kowalski et al. |
| 3,825,236 A | 7/1974 | Hussmann et al. |
| 3,865,528 A | 2/1975 | Roess |
| 3,938,924 A | 2/1976 | Abella et al. |
| 4,057,376 A | 11/1977 | Berger |
| 4,057,607 A | 11/1977 | Soehngen et al. |
| 4,172,477 A | 10/1979 | Reich |
| 4,192,617 A | 3/1980 | Spielhoff |
| 4,268,176 A | 5/1981 | Muller |
| 4,289,409 A | 9/1981 | Brand |
| 4,370,302 A | 1/1983 | Suzuoka et al. |
| 4,564,349 A | 1/1986 | Brown |
| 4,591,487 A | 5/1986 | Fritsch |
| 4,919,872 A | 4/1990 | Fintel |
| 5,102,594 A | 4/1992 | Burlet et al. |
| 5,108,711 A | 4/1992 | Chszaniecki |
| 5,143,308 A | 9/1992 | Hally et al. |
| 5,224,383 A | 7/1993 | Pinto et al. |
| 5,225,130 A | 7/1993 | Deiringer |
| 5,266,601 A | 11/1993 | Kyber et al. |
| 5,306,803 A | 4/1994 | Arlt et al. |
| 5,393,140 A | 2/1995 | Blach |
| 5,424,013 A | 6/1995 | Lieberman |
| 5,427,881 A | 6/1995 | Sacripante et al. |
| 5,459,168 A | 10/1995 | Nasr et al. |
| 5,497,562 A | 3/1996 | Pikus |
| 5,503,788 A | 4/1996 | Lazareck et al. |
| 5,510,073 A | 4/1996 | Kaegi et al. |
| 5,532,035 A | 7/1996 | Corbin et al. |
| 5,549,957 A | 8/1996 | Negola et al. |
| 5,554,657 A | 9/1996 | Brownscombe et al. |
| 5,613,285 A | 3/1997 | Chester et al. |
| 5,623,012 A | 4/1997 | Hwo |
| 5,715,584 A | 2/1998 | Coons, III et al. |
| 5,804,115 A | 9/1998 | Burton et al. |
| 5,836,682 A | 11/1998 | Blach |
| 5,886,058 A | 3/1999 | Van Erden et al. |
| 5,893,702 A | 4/1999 | Conrad et al. |
| 5,932,691 A | 8/1999 | Khanin et al. |
| 5,945,215 A | 8/1999 | Bersted et al. |
| 5,951,159 A | 9/1999 | Schobert-Csongor et al. |
| 5,958,548 A | 9/1999 | Negola et al. |
| 5,961,054 A | 10/1999 | Nishibori |
| 6,007,892 A | 12/1999 | Harwood et al. |
| 6,074,084 A | 6/2000 | Kolossow |
| 6,113,825 A | 9/2000 | Chuah |
| 6,265,533 B1 | 7/2001 | Regel et al. |
| 6,394,644 B1 | 5/2002 | Streiff |
| 6,492,485 B1 | 12/2002 | Gohr et al. |
| 6,620,354 B1 | 9/2003 | Bessemer et al. |
| 6,627,127 B1 | 9/2003 | Piovoso et al. |
| 6,722,117 B2 | 4/2004 | Belcher, Jr. et al. |
| 6,773,718 B2 | 8/2004 | Seth et al. |
| 6,784,214 B1 | 8/2004 | Bacher et al. |
| 6,852,256 B2 | 2/2005 | Borer et al. |
| 6,984,694 B2 | 1/2006 | Blasius, Jr. et al. |
| 7,025,491 B2 | 4/2006 | Blach et al. |
| 7,192,545 B2 | 3/2007 | Ekart et al. |
| 7,198,400 B2 | 4/2007 | Unterlander et al. |
| 7,204,945 B2 | 4/2007 | Bonner |
| 7,262,380 B1 | 8/2007 | Ulrichsen et al. |
| 7,320,589 B2 | 1/2008 | Babin et al. |

(56) References Cited

U.S. PATENT DOCUMENTS

| | | |
|---|---|---|
| 7,354,988 B2 | 4/2008 | Charati et al. |
| 7,380,973 B2 | 6/2008 | Goedicke et al. |
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,654,725 B2 | 2/2010 | Sturm et al. |
| 7,700,015 B2 | 4/2010 | Kern et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 | 12/2013 | Clark |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |
| 9,636,860 B2 | 5/2017 | Clark |
| 9,908,263 B2 | 3/2018 | Pichler et al. |
| 2002/0086077 A1 | 7/2002 | Noller et al. |
| 2004/0053047 A1 | 3/2004 | Jackson et al. |
| 2004/0082672 A1 | 4/2004 | Zeng et al. |
| 2004/0140248 A1 | 7/2004 | Dauzvardis et al. |
| 2004/0155374 A1 | 8/2004 | Hutchinson et al. |
| 2005/0047267 A1 | 3/2005 | Gneuss et al. |
| 2005/0263941 A1 | 12/2005 | Reutter et al. |
| 2006/0012074 A1 | 1/2006 | Booth et al. |
| 2006/0076705 A1 | 4/2006 | Fowler et al. |
| 2006/0284334 A1 | 12/2006 | Christel |
| 2007/0052131 A1 | 3/2007 | Fujimaki et al. |
| 2007/0261777 A1 | 11/2007 | Steckelberg et al. |
| 2008/0004202 A1 | 1/2008 | Wolfgang et al. |
| 2008/0069916 A1 | 3/2008 | Regalia |
| 2008/0139700 A1 | 6/2008 | Roden et al. |
| 2008/0157425 A1 | 7/2008 | Rodgers et al. |
| 2008/0214701 A1 | 9/2008 | Wilms et al. |
| 2008/0272508 A1 | 11/2008 | Culbert et al. |
| 2008/0292831 A1 | 11/2008 | Juriga et al. |
| 2009/0004325 A1 | 1/2009 | Bacher et al. |
| 2009/0039542 A1 | 2/2009 | Morton-Finger |
| 2009/0270564 A1 | 10/2009 | Gorlier et al. |
| 2009/0286919 A1 | 11/2009 | Moeller et al. |
| 2010/0102475 A1 | 4/2010 | Moon et al. |
| 2010/0113626 A1 | 5/2010 | Liu |
| 2011/0177283 A1 | 7/2011 | Juriga |
| 2011/0257345 A1 | 10/2011 | Hoover, Jr. et al. |
| 2012/0070615 A1 | 3/2012 | Shi et al. |
| 2012/0279023 A1 | 11/2012 | Burout et al. |
| 2015/0069652 A1 | 3/2015 | Clark |
| 2015/0069655 A1 | 3/2015 | Clark |
| 2015/0076725 A1 | 3/2015 | Clark |
| 2015/0076744 A1 | 3/2015 | Clark |
| 2017/0136761 A1 | 5/2017 | Sieradzki et al. |
| 2017/0152611 A1 | 6/2017 | Clark |
| 2017/0275785 A1 | 9/2017 | Williams et al. |
| 2018/0126595 A1 | 5/2018 | Clark |
| 2018/0362723 A1 | 12/2018 | Gneuss et al. |

FOREIGN PATENT DOCUMENTS

| | | |
|---|---|---|
| CH | 170967 A | 8/1934 |
| CN | 101444954 | 6/2009 |
| CN | 101778705 | 7/2010 |
| CN | 201872322 | 6/2011 |
| CN | 202072825 | 12/2011 |
| CN | 102990903 | 3/2013 |
| CN | 104040040 | 9/2014 |
| CN | 204265905 | 4/2015 |
| DE | 2243024 A1 | 3/1973 |
| DE | 4433593 | 6/1995 |
| DE | 19722278 | 12/1998 |
| DE | 102006033089 | 10/2007 |
| DE | 102008018686 | 10/2009 |
| DE | 102011082769 | 3/2013 |
| DE | 102013000316 | 7/2014 |
| DE | 102017111275 | 11/2018 |
| EP | 0846860 A2 | 6/1998 |
| EP | 0881054 | 12/1998 |
| EP | 1400332 | 3/2004 |
| EP | 2748358 | 7/2014 |
| EP | 3375916 | 9/2018 |
| GB | 2141844 | 1/1985 |
| JP | 63191823 | 8/1988 |
| JP | 2003530478 | 10/2003 |
| WO | 2001021373 | 3/2001 |
| WO | 2002038276 | 5/2002 |
| WO | 2003033240 | 4/2003 |
| WO | 2004/026557 | 4/2004 |
| WO | 2008017843 | 2/2008 |
| WO | 2008083820 | 7/2008 |
| WO | 2010133531 | 11/2010 |
| WO | 2011088437 | 7/2011 |
| WO | 2011095361 | 8/2011 |
| WO | 2012119165 | 9/2012 |
| WO | 2013180941 | 12/2013 |
| WO | 2016081495 | 5/2016 |
| WO | 2018089346 | 5/2018 |

OTHER PUBLICATIONS

Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 21, 2015, from corresponding U.S. Appl. No. 14/256,261.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.
Office Action, dated Oct. 9, 2018, from corresponding U.S. Appl. No. 15/419,955.
Office Action, dated Sep. 7, 2018, from corresponding U.S. Appl. No. 15/396,143.
Restriction Requirement, dated Apr. 30, 2013, from corresponding U.S. Appl. No. 13/721,955.

(56) References Cited

OTHER PUBLICATIONS

Restriction Requirement, dated Feb. 5, 2019, from corresponding U.S. Appl. No. 16/220,733.
Schiefer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Sep. 2, 2013, from corresponding International Application No. PCT/US2013/040753.
Restriction Requirement, dated Jul. 15, 2019, from corresponding U.S. Appl. No. 16/432,579.
Office Action, dated Jul. 23, 2019, from corresponding U.S. Appl. No. 16/041,442.
Notice of Allowance, dated Aug. 1, 2019, from corresponding U.S. Appl. No. 15/396,143.
"MRS extrusion technology offers new options in PET", Plastics Additives and Compounding, Elsevier Science, Oxofrd, GB, vol. 11, No. 2, Mar. 1, 2009 (Mar. 1, 2009), pp. 24-26, XP026067788, ISSN: 1464-391X. DOI:10.1016/S1464-391X(09)70050-9 [retrieved on Mar. 1, 2009] the whole document.
"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2015, from corresponding Australian Patent Application No. 2016234917.
Australian Office Action, dated May 9, 2014, from corresponding Australian Patent Application No. 2013267847.
Chinese Office Action, dated May 12, 2016, from corresponding Chinese Patent Application No. 201380003461.8.
Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 18170112.9.
Final Office Action, dated Dec. 24, 2015, from corresponding U.S. Appl. No. 14/256,261.
Final Office Action, dated May 22, 2019, from corresponding U.S. Appl. No. 15/396,143.

Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.
International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Search Report, dated Apr. 12, 2018, from corresponding International Application No. PCT/US2018/015751.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Sep. 2, 2013, from corresponding International Application No. PCT/US2013/040753.
Invitation to Pay Additional Search Fees, dated Jan. 5, 2018, from corresponding International Application Serial No. PCT/US2017/060359.
Jaecker M: "The Conceptual Concept of the Future // Advantages of the Negative-Conical Gangti EFE on Double-Screw Extruders", Kunststoffe, Carl Hanser Verlag, Munchen, DE, vol. 99, No. 12, Dec. 1, 2000 (Dec. 91, 2000), p. 64,66, XP990976191, ISSN: 9923-5563, figure 1.
Korean Office Action, dated Aug. 18, 2014, from corresponding Korean Patent Application No. 10-2014-7016621.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Apr. 17, 2019, from corresponding U.S. Appl. No. 16/220,733.
Notice of Allowance, dated Dec. 13, 2018, from corresponding U.S. Appl. No. 15/473,385.
Notice of Allowance, dated Feb. 2, 2017, from corresponding U.S. Appl. No. 14/546,819.

(56) References Cited

OTHER PUBLICATIONS

Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.
Notice of Allowance, dated Jan. 24, 2019, from corresponding U.S. Appl. No. 15/473,402.
Notice of Allowance, dated Jul. 5, 2018, from corresponding U.S. Appl. No. 15/204,645.
Notice of Allowance, dated May 1, 2019, from corresponding U.S. Appl. No. 15/419,955.
Notice of Allowance, dated Oct. 28, 2013, from corresponding U.S. Appl. No. 13/721,955.
Office Action, dated Aug. 8, 2019, from corresponding U.S. Appl. No. 16/409,599.
International Preliminary Report on Patentability, dated Aug. 8, 2019, from corresponding International Application No. PCT/US2018/015751.
Office Action, dated Aug. 13, 2019, from corresponding U.S. Appl. No. 16/213,694.
Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.
Machado, Almir De Souza, "Fundamentals of Cast Film Extrusion Technology," https://www.slideshare.net/ASMachado/fundamentals-of-cast-film-extrusion-technology, Dec. 2, 2013.
Office Action, dated Aug. 26, 2019, from corresponding U.S. Appl. No. 16/220,905.
International Preliminary Report on Patentability, dated Sep. 12, 2019, from corresponding International Application No. PCT/US2018/020746.
Office Action, dated Sep. 12, 2019, from corresponding U.S. Appl. No. 16/432,579.
Notice of Allowance, dated Oct. 10, 2019, from corresponding U.S. Appl. No. 16/432,579.
Austrian Patent Application No. A 330/2011, filed Mar. 10, 2011, entitled "Verfahren und Vorrichtung zum Entfernen von Verunreinigungen aus einer Kunststoffschmelze".
International Search Report, dated Jul. 5, 2012, from corresponding International Application No. PCT/AT2012/000052.
Office Action, dated Nov. 25, 2019, from corresponding U.S. Appl. No. 15/804,501.
Office Action, dated Nov. 29, 2019, from corresponding U.S. Appl. No. 16/557,076.
Office Action, dated Dec. 2, 2019, from corresponding U.S. Appl. No. 16/564,730.

METHODS FOR MANUFACTURING BULKED CONTINUOUS FILAMENT

CROSS REFERENCE TO RELATED APPLICATIONS

This application is a continuation of U.S. patent application Ser. No. 16/041,442, filed Jul. 20, 2018, which is a continuation of U.S. patent application Ser. No. 15/204,645, filed Jul. 7, 2016, now U.S. Pat. No. 10,124,513, issued Nov. 13, 2018, which is a continuation of U.S. patent application Ser. No. 14/256,261, filed Apr. 18, 2014, now U.S. Pat. No. 9,409,363, issued Aug. 9, 2016, which is a continuation of U.S. patent application Ser. No. 13/892,713, filed May 13, 2013, now U.S. Pat. No. 9,550,338, issued Jan. 24, 2017, which is a divisional of U.S. patent application Ser. No. 13/721,955, filed Dec. 20, 2012, now U.S. Pat. No. 8,597,553, issued Dec. 3, 2013, which claims priority from U.S. Provisional Patent Application Ser. No. 61/654,016, filed May 31, 2012, the entire disclosures of which are hereby incorporated by reference in their entirety.

BACKGROUND

Because pure virgin PET polymer is more expensive than recycled PET polymer, and because of the environmental benefits associated with using recycled polymer, it would be desirable to be able to produce bulked continuous carpet filament from 100% recycled PET polymer (e.g., PET polymer from post-consumer PET bottles).

SUMMARY

A method of manufacturing bulked continuous carpet filament, in various embodiments, comprises providing a multi-screw extruder. In particular embodiments, the multi-screw extruder comprises: (A) a housing that defines at least six satellite screw barrels; (B) at least six satellite screws each mounted within a respective one of the at least six satellite screw barrels and mounted to rotate about a respective central axis of each of the at least six satellite screws; and (C) a pressure regulation system that is adapted to maintain a pressure within each of the respective satellite screw barrels between about 0.5 millibars and about 5 millibars. In particular embodiments, the method further comprises: (A) using the pressure regulation system to reduce a pressure within the at least six satellite screw barrels to between about 0.5 millibars and about 5 millibars; (B) while maintaining the pressure within the at least six satellite screw barrels between about 0.5 millibars and about 5 millibars, passing a melt comprising recycled polymer through the multi-screw extruder so that at least a portion of the melt is fed through each of the at least six satellite screws; and (C) after the step of passing the melt of recycled polymer through the multi-screw extruder, forming the recycled polymer into bulked continuous carpet filament.

An extruder for use in extruding a polymer melt, according to particular embodiments, comprises at least: (1) a first satellite screw extruder comprising a first satellite screw that is mounted to rotate about a central axis of the first satellite screw; (2) a second satellite screw extruder comprising a second satellite screw that is mounted to rotate about a central axis of the second satellite screw; and (3) a pressure regulation system that is adapted to maintain a pressure within the first and second satellite screw extruders below a pressure of about 5 millibars as the polymer melt passes through the first and second screw extruders.

A bulked continuous carpet filament, according to various embodiments, consists essentially of a recycled polymer.

A method of manufacturing carpet filament, according to particular embodiments, comprises the steps of: (A) washing a group of polymer flakes to remove at least a portion of one or more contaminants from a surface of the flakes, the group of flakes comprising a first plurality of flakes that consist essentially of PET and a second plurality of flakes that do not consist essentially of PET; (B) after the step of washing the first plurality of flakes: (i) scanning the washed group of flakes to identify the second plurality of flakes, and (ii) separating the second plurality of flakes from the first plurality of flakes; (C) melting the second plurality of flakes to produce a polymer melt; (D) providing an extruder that extrudes material in a plurality of different extrusion streams; (E) reducing a pressure within the extruder to below about 5 millibars; (F) while maintaining the pressure within the extruder below about 5 millibars, passing the polymer melt through the extruder so that the polymer melt is divided into at least eight extrusion streams, each having a pressure below about 5 millibars; (G) after passing the polymer melt through the extruder, forming the recycled polymer into bulked continuous carpet filament.

A method of manufacturing bulked continuous carpet filament, the method comprising: (1) providing a polymer melt from an extruder to a chamber; (2) separating the polymer melt from the extruder into at least eight streams such that each stream is at least partially exposed to an interior of the chamber and such that a respective surface area of each of the at least eight streams is exposed to a chamber pressure within the chamber, the chamber pressure being below about 5 millibars; (3) after the at least eight streams are exposed to the chamber pressure, recombining the at least eight streams into a single polymer stream; and (4) forming polymer from the single polymer stream into bulked continuous carpet filament.

A method for manufacturing bulked continuous carpet filament, the method comprising: (1) providing an extruder; (2) providing a plurality of polymer flakes to the extruder; (3) melting the plurality of polymer flakes within the extruder to create a polymer melt; (4) transferring the polymer melt to an interior of a chamber; (4) increasing a surface area of the polymer melt exposed to the interior of the chamber utilizing at least eight streams of the polymer melt; (5) reducing a pressure within the chamber to reach a chamber pressure of below about 5 millibars; (6) exposing the at least eight streams of the polymer melt to the chamber pressure of below about 5 millibars while the at least eight streams of the polymer melt are in the chamber; (7) after exposing the at least eight streams of the polymer melt to the chamber pressure of below about 5 millibars, recombining the at least eight streams into a single polymer stream; and (8) forming polymer from the single polymer stream into bulked continuous carpet filament.

A method for manufacturing bulked continuous carpet filament, the method comprising: (1) reducing a chamber pressure within a chamber to below about 5 millibars; (2) after reducing the chamber pressure to below about 5 millibars, providing a polymer melt to the chamber; (3) separating the polymer melt into at least eight streams; (4) while the at least eight streams of the polymer melt are within the chamber, exposing the at least eight streams of the polymer melt to the chamber pressure of below about 5 millibars; (5) after exposing the at least eight streams of the polymer melt to the chamber pressure of below about 5 millibars, recombining the at least eight streams into a single polymer stream; and (6) forming polymer from the single polymer stream into bulked continuous carpet filament.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Figure 1:
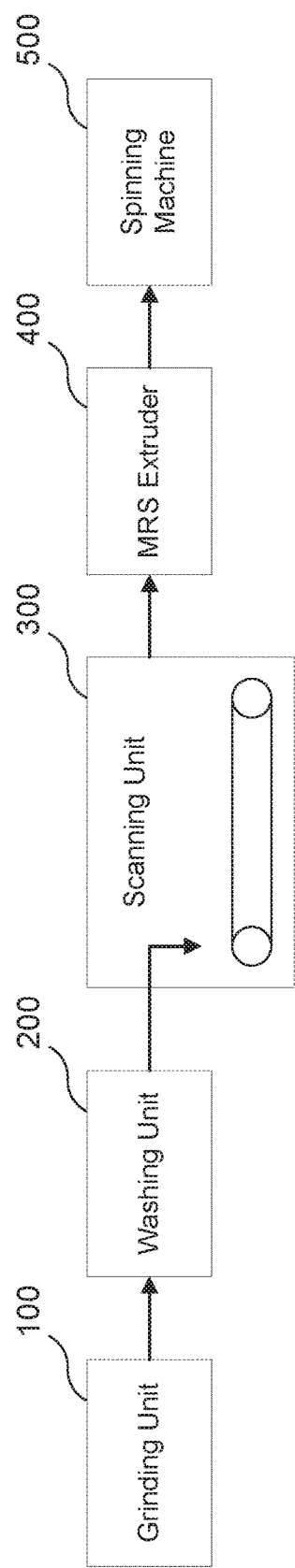
FIG. 1 depicts a process flow, according to a particular embodiment, for manufacturing bulked continuous carpet filament.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

I. Overview

New processes for making fiber from recycled polymer (e.g., recycled PET polymer) are described below. In various embodiments, this new process: (1) is more effective than earlier processes in removing contaminates and water from the recycled polymer; and/or (2) does not require the polymer to be melted and cooled as many times as in earlier processes. In at least one embodiment, the improved process results in a recycled PET polymer having a polymer quality that is high enough that the PET polymer may be used in producing bulked continuous carpet filament from 100% recycled PET content (e.g., 100% from PET obtained from previously used PET bottles). In particular embodiments, the recycled PET polymer has an intrinsic viscosity of at least about 0.79 dL/g (e.g., of between about 0.79 dL/g and about 1.00 dL/g).

II. More Detailed Discussion

A BCF (bulked continuous filament) manufacturing process, according to a particular embodiment, may generally be broken down into three steps: (1) preparing flakes of PET polymer from post-consumer bottles for use in the process; (2) passing the flakes through an extruder that melts the flakes and purifies the resulting PET polymer; and (3) feeding the purified polymer into a spinning machine that turns the polymer into filament for use in manufacturing carpets. These three steps are described in greater detail below.

Step 1: Preparing Flakes of PET Polymer from Post-Consumer Bottles

In a particular embodiment, the step of preparing flakes of PET polymer from post-consumer bottles comprises: (A) sorting post-consumer PET bottles and grinding the bottles into flakes; (B) washing the flakes; and (C) identifying and removing any impurities or impure flakes.

A. Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYL-CYCLE machine from National Recovery Technologies of Nashville, Tenn. may be utilized to remove remaining PVC contaminants.

In particular embodiments, a binary segregation of the clear materials from the colored materials is achieved using automated color sorting equipment equipped with a camera detection system (e.g., an Multisort ES machine from National Recovery Technologies of Nashville, Tenn.). In various embodiments, manual sorters are stationed at various points on the line to remove contaminants not removed by the sorter and any colored bottles. In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

B. Washing the Flakes

In particular embodiments, the "dirty flake" is then mixed into a series of wash tanks. As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, the flake is then taken through a flake color sorting step (e.g., using an OPTIMIX machine from TSM Control Systems of Dundalk, Ireland) to remove any remaining color contaminants remaining in the flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

C. Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described in Step 2 below), which includes a vacuum setup designed to remove—among other things—the interstitial water that remains present in the flakes following the quick-drying process described above.

Step 2: Using an Extrusion System to Melt and Purify PET Flakes

Figure 2:
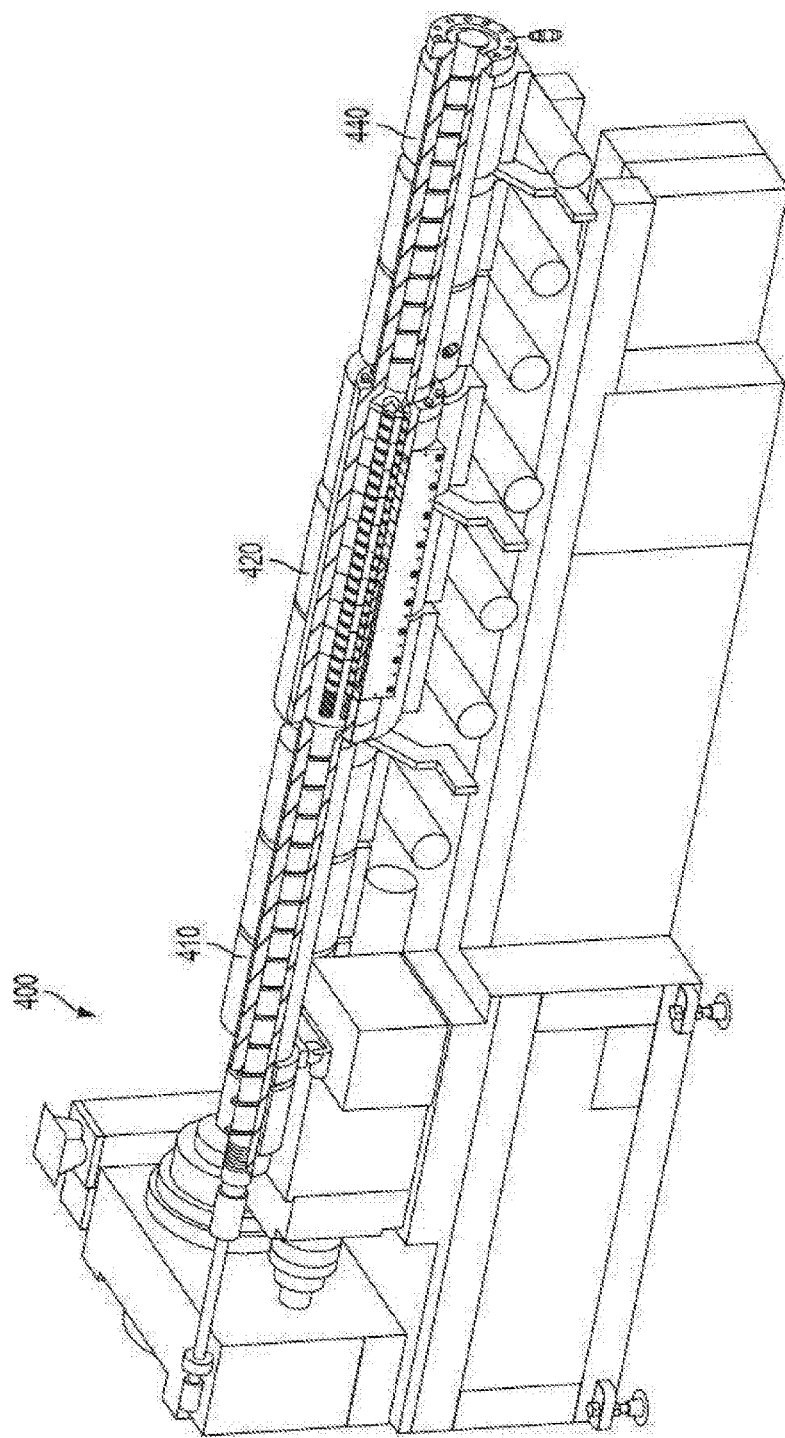
FIG. 2 is a perspective view of an MRS extruder that is suitable for use in the process of FIG. 1.
Figure 3:
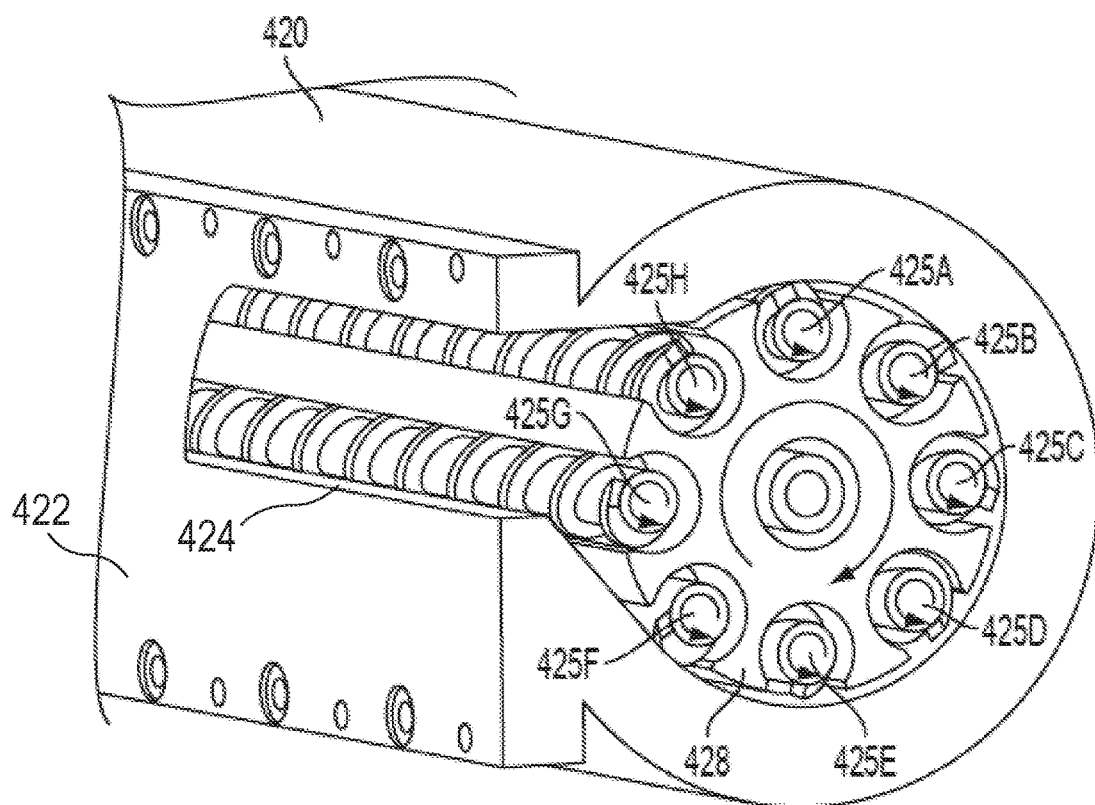
FIG. 3 is a cross-sectional view of an exemplary MRS section of the MRS extruder of FIG. 2.

In particular embodiments, an extruder is used to turn the wet flakes described above into a molten recycled PET polymer and to perform a number of purification processes to prepare the polymer to be turned into BCF for carpet. As noted above, in various embodiments, after STEP 1 is complete, the recycled PET polymer flakes are wet (e.g., surface water is substantially removed (e.g., fully removed) from the flakes, but interstitial water remains in the flakes). In particular embodiments, these wet flakes are fed into a Multiple Rotating Screw ("MRS") extruder 400. In other embodiments, the wet flakes are fed into any other suitable extruder (e.g., a twin screw extruder, a multiple screw extruder, a planetary extruder, or any other suitable extrusion system). An exemplary MRS Extruder 400 is shown in FIGS. 2 and 3. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from this figure, in particular embodiments, the MRS extruder includes a first single-screw extruder section 410 for feeding material into an MRS section 420 and a second single-screw extruder section 440 for transporting material away from the MRS section.

In various embodiments, the wet flakes are fed directly into the MRS extruder 400 substantially immediately (e.g., immediately) following the washing step described above (e.g., without drying the flakes or allowing the flakes to dry). In particular embodiments, a system that feeds the wet flakes directly into the MRS Extruder 400 substantially immediately (e.g., immediately) following the washing step described above may consume about 20% less energy than a system that substantially fully pre-dries the flakes before extrusion (e.g., a system that pre-dries the flakes by passing hot air over the wet flakes for a prolonged period of time). In various embodiments, a system that feeds the wet flakes directly into the MRS Extruder 400 substantially immediately (e.g., immediately) following the washing step described above avoids the need to wait a period of time (e.g., up to eight hours) generally required to fully dry the flakes (e.g., remove all of the surface and interstitial water from the flakes).

Figure 4:
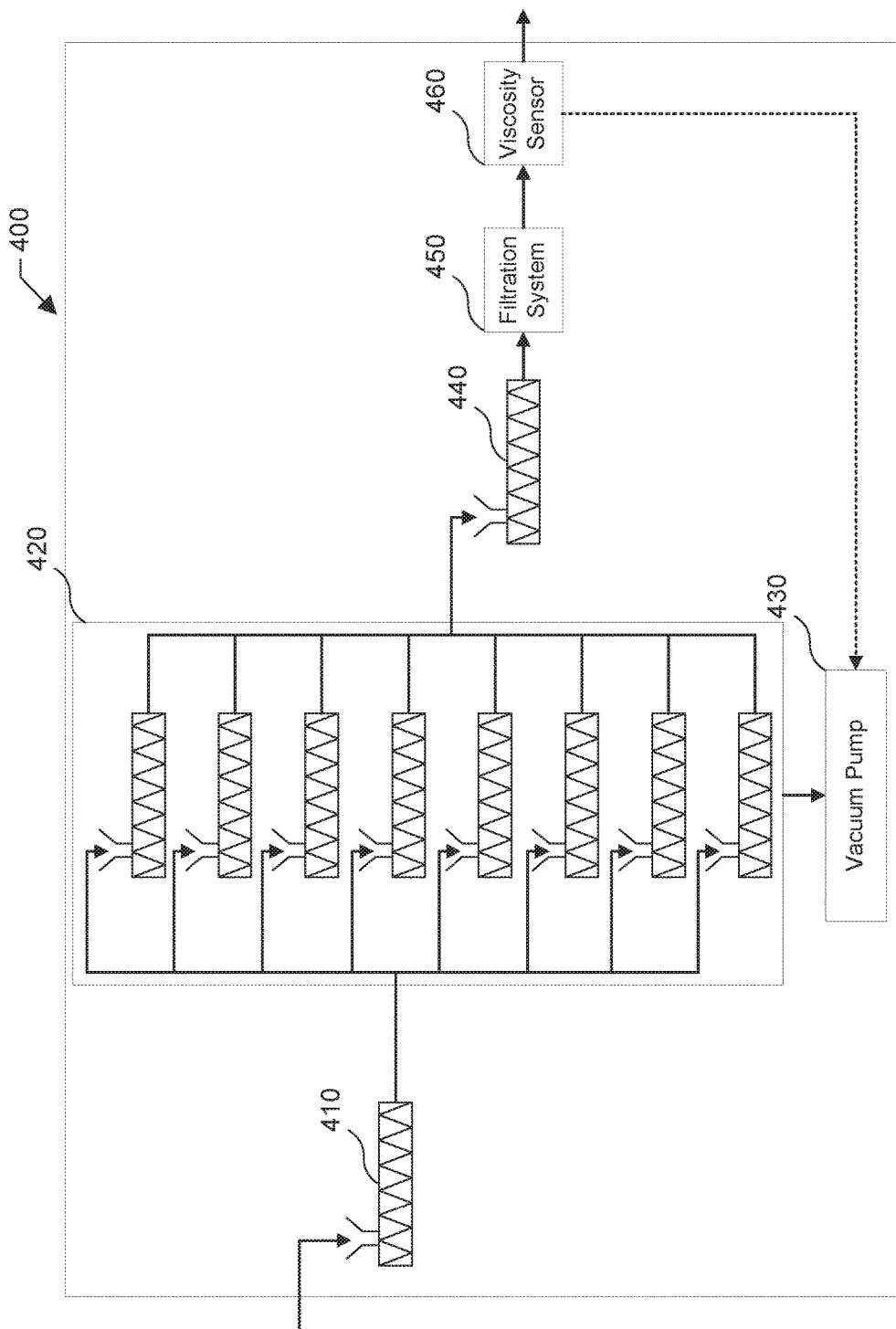
FIG. 4 depicts a process flow depicting the flow of polymer through an MRS extruder and filtration system according to a particular embodiment.

FIG. 4 depicts a process flow that illustrates the various processes performed by the MRS Extruder 400 in a particular embodiment. In the embodiment shown in this figure, the wet flakes are first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted flakes), in various embodiments, is then fed into the extruder's MRS section 420, in which the extruder separates the melt flow into a plurality of different streams (e.g., 4, 6, 8, or more streams) through a plurality of open chambers. FIG. 3 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 2, in particular embodiments, these satellite screws are substantially parallel (e.g., parallel) to one other and to a primary screw axis of the MRS Machine 400.

In the MRS section 420, in various embodiments, the satellite screws 425A-H may, for example, rotate faster than (e.g., about four times faster than) in previous systems. As shown in FIG. 3, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty five times greater than the melt surface area created by a co-rotating twin screw extruder In various embodiments, the MRS extruder's MRS Section 420 is fitted with a Vacuum Pump 430 that is attached to a vacuum attachment portion 422 of the MRS section 420 so that the Vacuum Pump 430 is in communication with the interior of the MRS section via a suitable opening 424 in the MRS section's housing. In still other embodiments, the MRS Section 420 is fitted with a series of Vacuum Pumps. In particular embodiments, the Vacuum Pump 430 is configured to reduce the pressure within the interior of the MRS Section 420 to a pressure that is between about 0.5 millibars and about 5 millibars. In particular embodiments, the Vacuum Pump 430 is configured to reduce the pressure in the MRS Section 420 to less than about 1.5 millibars (e.g., about 1 millibar or less). The low-pressure vacuum created by the Vacuum Pump 430 in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminates from the polymer stream.

In a particular example, the Vacuum Pump 430 comprises three mechanical lobe vacuum pumps (e.g., arranged in series) to reduce the pressure in the chamber to a suitable level (e.g., to a pressure of about 1.0 millibar). In other embodiments, rather than the three mechanical lobe vacuum pump arrangement discussed above, the Vacuum Pump 430 includes a jet vacuum pump fit to the MRS extruder. In various embodiments, the jet vacuum pump is configured to achieve about 1 millibar of pressure in the interior of the MRS section 420 and about the same results described above regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 430 is a jet vacuum pump is made by Arpuma GmbH of Bergheim, Germany.

In particular embodiments, after the molten polymer is run the through the multi-stream MRS Section 420, the streams of molten polymer are recombined and flow into the MRS extruder's second single screw section 440. In various embodiments, the single stream of molten polymer is next run through a filtration system 450 that includes at least one filter. In a particular embodiment, the filtration system 450 includes two levels of filtration (e.g., a 40 micron screen filter followed by a 25 micron screen filter). Although, in various embodiments, water and volatile organic impurities are removed during the vacuum process as discussed above, particulate contaminates such as, for example, aluminum particles, sand, dirt, and other contaminants may remain in the polymer melt. Thus, this filtration step may be advantageous in removing particulate contaminates (e.g., particulate contaminates that were not removed in the MRS Section 420).

In particular embodiments, a viscosity sensor 460 (see FIG. 4) is used to sense the melt viscosity of the molten polymer stream following its passage through the filtration system 450. In various embodiments, the viscosity sensor 460, measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may: (1) discard the portion of the stream with low intrinsic viscosity; and/or (2) lower the pressure in the MRS Section 420 in order to achieve a higher intrinsic viscosity in the polymer melt. In particular embodiments, decreasing the pressure in the MRS Section 420 is executed in a substantially automated manner (e.g., automatically) using the viscosity sensor in a computer-controlled feedback control loop with the vacuum section 430.

In particular embodiments, removing the water and contaminates from the polymer improves the intrinsic viscosity of the recycled PET polymer by allowing polymer chains in the polymer to reconnect and extend the chain length. In particular embodiments, following its passage through the MRS Section 420 with its attached Vacuum Pump 430, the recycled polymer melt has an intrinsic viscosity of at least about 0.79 dL/g (e.g., of between about 0.79 dL/g and about 1.00 dL/g). In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the water removed by the vacuum includes both water from the wash water used to clean the recycled PET bottles as described above, as well as from unreacted water generated by the melting of the PET polymer in the single screw heater 410 (e.g., interstitial water). In particular embodiments, the majority of water present in the polymer is wash water, but some percentage may be unreacted water.

In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Step 3: Purified PET Polymer Fed into Spinning Machine to be Turned into Carpet Yarn In particular embodiments, after the recycled PET polymer has been extruded and purified by the above-described extrusion process, the resulting molten recycled PET polymer is fed directly into a BCF (or "spinning") machine 500 that is configured to turn the molten polymer into bulked continuous filament. For example, in various embodiments, the output of the MRS extruder 400 is connected substantially directly (e.g., directly) to the input of the spinning machine 500 so that molten polymer from the extruder is fed directly into the spinning machine 500. This process may be advantageous because molten polymer may, in certain embodiments, not need to be cooled into pellets after extrusion (as it would need to be if the recycled polymer were being mixed with virgin PET polymer). In particular embodiments, not cooling the recycled molten polymer into pellets serves to avoid potential chain scission in the polymer that might lower the polymer's intrinsic viscosity.

In particular embodiments, the spinning machine 500 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 500 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 500 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows it to be run at higher speeds through the spinning machine 500 than would be possible using pure virgin PET polymer. This may allow for higher processing speeds than are possible when using virgin PET polymer.

Summary of Exemplary Process

Figure 5:
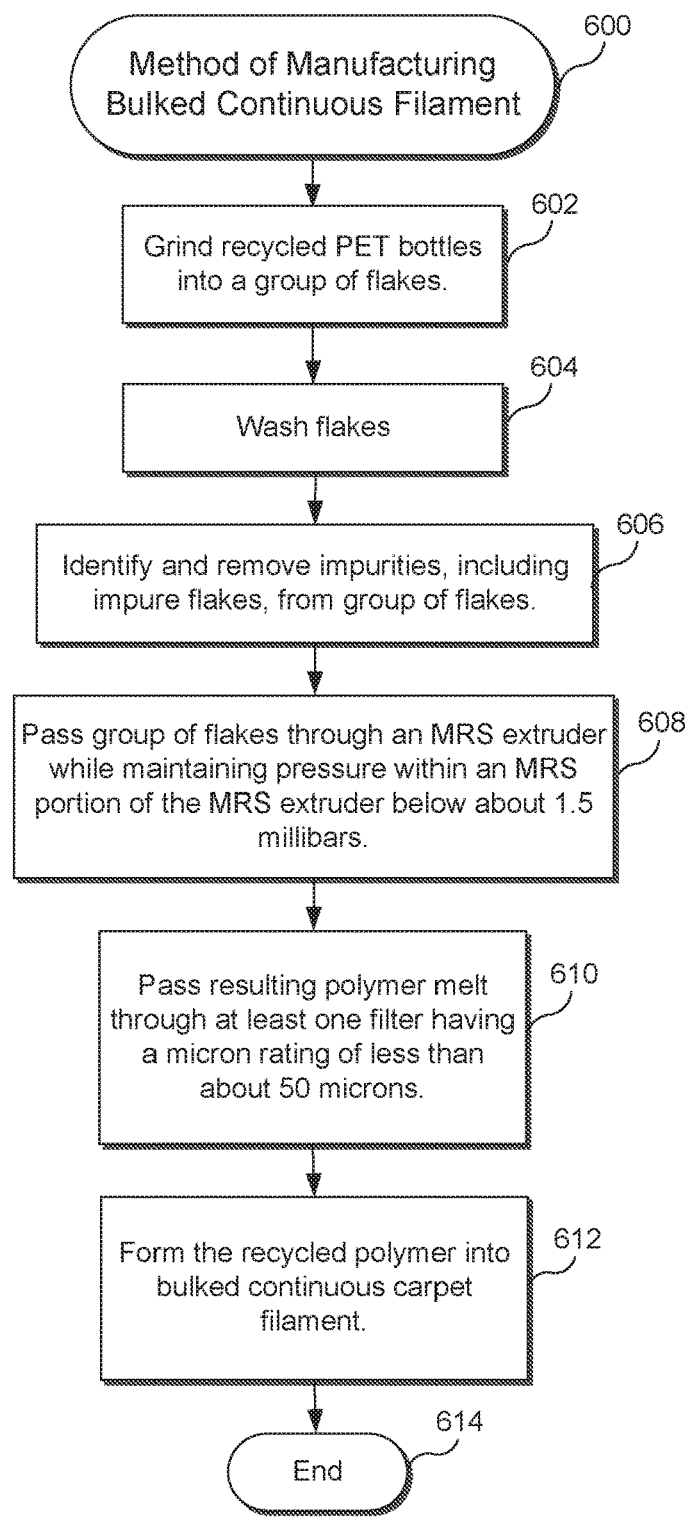
FIG. 5 is a high-level flow chart of a method, according to various embodiments, of manufacturing bulked continuous carpet filament.

FIG. 5 provides a high-level summary of the method of manufacturing bulked continuous filament described above. As shown in the figure, the method begins at Step 602, where recycled PET bottles are ground into a group of flakes. Next, at Step 604, the group of flakes is washed to remove contaminants from the flakes' respective outer surfaces. Next, at Step 606, the group of flakes is scanned (e.g., using one or more of the methods discussed above) to identify impurities, including impure flakes. These impurities, and impure flakes, are then removed from the group of flakes.

Next, at Step 608, the group of flakes is passed through an MRS extruder while maintaining the pressure within an MRS portion of the extruder below about 1.5 millibars. At Step 610, the resulting polymer melt is passed through at least one filter having a micron rating of less than about 50 microns. Finally, at Step 612, the recycled polymer is formed into bulked continuous carpet filament, which may be used in producing carpet. The method then ends at Step 614.

Alternative Embodiments

In particular embodiments, the system may comprise alternative components or perform alternative processes in order to produce substantially continuous BCF from 100% recycled PET, or other recycled polymer. Exemplary alternatives are discussed below.

Non-MRS Extrusion System

In particular embodiments, the process may utilize a polymer flow extrusion system other than the MRS Extruder described above. The alternative extrusion system may include for example, a twin screw extruder, a multiple screw extruder, a planetary extruder, or any other suitable extrusion system. In a particular embodiment, the process may include a plurality of any combination of any suitable conical screw extruders (e.g., four twin screw extruders, three multiple screw extruders, etc.).

Making Carpet Yarn from 100% Recycled Carpet

In particular embodiments, the process described above may be adapted for processing and preparing old carpet (or any other suitable post-consumer product) to produce new carpet yarn comprising 100% recycled carpet. In such embodiments, the process would begin by grinding and washing recycled carpet rather than recycled PET bottles. In various embodiments where old carpet is converted into new carpet yarn comprising 100% recycled carpet, the process may comprise additional steps to remove additional materials or impurities that may be present in recycled carpet that may not be present in recycled PET bottles (e.g., carpet backing, adhesive, etc.).

Other Sources of Recycled PET

In various embodiments, the process described above is adapted for processing recycled PET from any suitable source (e.g., sources other than recycled bottles or carpet) to produce new carpet yarn comprising 100% recycled PET.

CONCLUSION

Many modifications and other embodiments of the invention will come to mind to one skilled in the art to which this invention pertains having the benefit of the teachings presented in the foregoing descriptions and the associated drawings. For example, although the vacuum system discussed above is described as being configured to maintain the pressure in the open chambers of the MRS extruder to about 1 mbar, in other embodiments, the vacuum system may be adapted to maintain the pressure in the open chambers of the MRS extruder at pressures greater than, or less than, 1 mbar. For example, the vacuum system may be adapted to maintain this pressure at between about 0.5 mbar and about 1.2 mbar.

Similarly, although various embodiments of the systems described above may be adapted to produce carpet filament from substantially only recycled PET (so the resulting carpet filament would comprise, consist of, and/or consist essentially of recycled PET), in other embodiments, the system may be adapted to produce carpet filament from a combination of recycled PET and virgin PET. The resulting carpet filament may, for example, comprise, consist of, and/or consist essentially of between about 80% and about 100% recycled PET, and between about 0% and about 20% virgin PET.

Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

In addition, it should be understood that various embodiments may omit any of the steps described above or add additional steps.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A method of manufacturing bulked continuous carpet filament, the method comprising:
    providing a polymer melt from an extruder to a chamber;
    separating the polymer melt from the extruder into at least eight streams such that each stream is at least partially exposed to an interior of the chamber and such that a respective surface area of each of the at least eight streams is exposed to a chamber pressure within the chamber, the chamber pressure being below about 5 millibars;
    after the at least eight streams are exposed to the chamber pressure, recombining the at least eight streams into a single polymer stream; and
    forming polymer from the single polymer stream into bulked continuous carpet filament.

2. The method of claim 1, wherein the chamber pressure is below about 1.5 millibars.

3. The method of claim 1, wherein the chamber pressure is below about 1 millibar.

4. The method of claim 1, wherein the chamber pressure is between about 0.5 millibars and about 5 millibars.

5. The method of claim 1, wherein the chamber pressure is between about 0.5 millibars and about 1.2 millibars.

6. The method of claim 1, further comprising:
    measuring an intrinsic viscosity of the single polymer stream; and
    in response to determining that the intrinsic viscosity of the single polymer stream is below a predetermined level, substantially automatically lowering the chamber pressure in order to achieve a higher intrinsic viscosity within the polymer melt.

7. The method of claim 1, wherein the polymer melt is derived, at least in part, from polyethylene terephthalate (PET) flakes that are derived from recycled PET bottles.

8. The method of claim 7, wherein the recycled PET bottles are post-consumer, curbside PET bottles.

9. A method for manufacturing bulked continuous carpet filament, the method comprising:
    providing an extruder;
    providing a plurality of polymer flakes to the extruder;
    melting the plurality of polymer flakes within the extruder to create a polymer melt;
    transferring the polymer melt to an interior of a chamber;
    increasing a surface area of the polymer melt exposed to the interior of the chamber utilizing at least eight different streams of the polymer melt;
    reducing a pressure within the chamber to reach a chamber pressure of below about 5 millibars;
    exposing the at least eight streams of the polymer melt to the chamber pressure of below about 5 millibars while the at least eight streams of the polymer melt are in the chamber;
    after exposing the at least eight streams of the polymer melt to the chamber pressure of below about 5 millibars, recombining the at least eight streams into a single polymer stream; and
    forming polymer from the single polymer stream into bulked continuous carpet filament.

10. The method of claim 9, wherein the step of recombining the at least eight streams into a single polymer stream comprises recombining the at least eight streams into a single polymer stream via a single screw extruder.

11. The method of claim 10, wherein the single screw extruder is used to transport polymer within the single polymer stream away from the chamber.

12. The method of claim 9, wherein the at least eight streams of the polymer melt comprise more than 8 streams of polymer melt.

13. The method of claim 9, wherein exposing the at least eight streams of the polymer melt to the chamber pressure while the at least eight streams of the polymer melt are in the chamber comprises exposing the at least eight streams of the polymer melt to a chamber pressure that is below about 1.5 millibars.

14. The method of claim 9, wherein exposing the at least eight streams of the polymer melt to the chamber pressure while the at least eight streams of the polymer melt are in the chamber comprises exposing the at least eight streams of the polymer melt to a chamber pressure that is below about 1 millibar.

15. The method of claim 9, wherein exposing the at least eight streams of the polymer melt to the chamber pressure while the at least eight streams of the polymer melt are in the chamber comprises exposing the at least eight streams of the polymer melt to a chamber pressure that is between about 0.5 millibars and about 5 millibars.

16. The method of claim 9, wherein exposing the at least eight streams of the polymer melt to the chamber pressure while the at least eight streams of the polymer melt are in the chamber comprises exposing the at least eight streams of the polymer melt to a chamber pressure that is between about 0.5 millibar and about 1.2 millibars.

17. The method of claim 9, further comprising:
    determining an intrinsic viscosity of the single polymer stream; and
    in response to determining that the intrinsic viscosity of the single polymer stream is below a predetermined level, substantially automatically lowering the chamber pressure.

18. The method of claim 17, wherein the predetermined level is about 0.8 g/dL.

19. The method of claim 9, wherein the plurality of polymer flakes comprises polyethylene terephthalate (PET) flakes derived from recycled PET bottles.

20. The method of claim 9, wherein forming polymer from the single polymer stream into bulked continuous carpet filament comprises forming polymer from the single polymer stream into bulked continuous carpet filament that comprises between about 80% and about 100% recycled PET.

21. A method for manufacturing bulked continuous carpet filament, the method comprising:
    reducing a chamber pressure within a chamber to below about 5 millibars;

after reducing the chamber pressure to below about 5 millibars, providing a polymer melt to the chamber;

separating the polymer melt into at least eight streams;

while the at least eight streams of the polymer melt are within the chamber, exposing the at least eight streams of the polymer melt to the chamber pressure of below about 5 millibars;

after exposing the at least eight streams of the polymer melt to the chamber pressure of below about 5 millibars, recombining the at least eight streams into a single polymer stream; and forming polymer from the single polymer stream into bulked continuous carpet filament.

22. The method of claim 21, wherein exposing the at least eight streams of the polymer melt to the chamber pressure while the at least eight streams of the polymer melt are within the chamber comprises exposing the at least eight streams of the polymer melt to a chamber pressure that is below about 1.5 millibars.

23. The method of claim 21, wherein exposing the at least eight streams of the polymer melt to the chamber pressure while the at least eight streams of the polymer melt are within the chamber comprises exposing the at least eight streams of the polymer melt to a chamber pressure that is below about 1 millibar.

24. The method of claim 21, wherein exposing the at least eight streams of the polymer melt to the chamber pressure while the at least eight streams of the polymer melt are within the chamber comprises exposing the at least eight streams of the polymer melt to a chamber pressure that is between about 0.5 millibars and about 5 millibars.

25. The method of claim 21, wherein exposing the at least eight streams of the polymer melt to the chamber pressure while the at least eight streams of the polymer melt are within the chamber comprises exposing the at least eight streams of the polymer melt to a chamber pressure that is between about 0.5 millibar and about 1.2 millibars.

26. The method of claim 21, further comprising:

determining an intrinsic viscosity of the single polymer stream; and in response to determining that the intrinsic viscosity of the single polymer stream is below a predetermined level, lowering the pressure in the chamber in a substantially automated manner via a computer-controlled feedback control loop.

27. The method of claim 21, further comprising melting polyethylene terephthalate (PET) flakes derived from recycled PET bottles to produce the polymer melt.

28. The method of claim 21, wherein forming polymer from the single polymer stream into bulked continuous carpet filament comprises forming polymer from the single polymer stream into bulked continuous carpet filament that comprises between about 80% and about 100% recycled PET.

29. The method of claim 21, wherein the step of recombining the at least eight streams into a single polymer stream comprises recombining the at least eight streams into a single polymer stream via a single screw extruder.

30. The method of claim 29, wherein the single screw extruder is used to transport polymer within the single polymer stream away from the chamber.

* * * * *

UNITED STATES PATENT AND TRADEMARK OFFICE
CERTIFICATE OF CORRECTION

Page 1 of 1

PATENT NO. : 10,532,496 B2
APPLICATION NO. : 16/402583
DATED : January 14, 2020
INVENTOR(S) : Thomas R. Clark It is certified that error appears in the above-identified patent and that said Letters Patent is hereby corrected as shown below:

In Other Publications, on page 5, "Office Action, dated Dec. 2, 2019, from corresponding U.S. Appl. No. 16/564,730," should read --Office Action, dated Dec. 2, 2019, from corresponding U.S. Appl. No. 16/664,730--.

Signed and Sealed this
Twenty-fifth Day of February, 2020

Andrei Iancu
*Director of the United States Patent and Trademark Office*